(12) United States Patent
Jaeger

(10) Patent No.: US 9,231,323 B1
(45) Date of Patent: Jan. 5, 2016

(54) SPACECRAFT DOCKING CONNECTOR

(71) Applicant: NovaWurks, Inc., Los Alamitos, CA (US)

(72) Inventor: Talbot Jaeger, Los Alamitos, CA (US)

(*) Notice: Subject to any disclaimer, the term of this patent is extended or adjusted under 35 U.S.C. 154(b) by 0 days.

(21) Appl. No.: 14/444,092

(22) Filed: Jul. 28, 2014

(51) Int. Cl.
*B64G 1/64* (2006.01)
*H01R 13/00* (2006.01)
*F16K 3/26* (2006.01)
*B05B 1/00* (2006.01)

(52) U.S. Cl.
CPC ............... *H01R 13/005* (2013.01); *B05B 1/00* (2013.01); *F16K 3/26* (2013.01)

(58) Field of Classification Search
USPC .................. 244/172.4, 172.5, 159.4, 158.1
See application file for complete search history.

(56) References Cited

U.S. PATENT DOCUMENTS

| | | | | |
|---|---|---|---|---|
| 3,809,002 A * | 5/1974 | Nagy | ...................... | B63B 21/58 114/245 |
| 4,228,976 A | 10/1980 | Eiselbrecher et al. | | |
| 4,431,333 A * | 2/1984 | Chandler | ............... | B64G 1/641 244/172.4 |
| 4,481,778 A | 11/1984 | Reinker et al. | | |
| 4,500,057 A * | 2/1985 | Duwelz | .................. | B64G 1/646 244/115 |
| 4,508,404 A | 4/1985 | Frawley | | |
| 4,799,476 A | 1/1989 | McGrady | | |
| 4,976,399 A | 12/1990 | Bay et al. | | |
| 5,104,070 A * | 4/1992 | Johnson | ................. | B64G 1/646 244/172.4 |
| 5,364,046 A * | 11/1994 | Dobbs | .................... | B64G 1/646 244/172.4 |
| 5,429,328 A * | 7/1995 | Dobbs | .................... | B64G 1/646 244/172.5 |
| 6,299,107 B1 * | 10/2001 | Kong | ..................... | B64G 1/646 244/172.4 |
| 6,330,093 B1 | 12/2001 | Eller et al. | | |
| 6,742,745 B2 * | 6/2004 | Tchoryk | ................ | B64G 1/646 244/172.4 |
| 6,969,030 B1 * | 11/2005 | Jones | ..................... | B64G 1/646 244/115 |
| 7,374,134 B2 * | 5/2008 | Collyer | .................... | B64G 4/00 219/72 |
| 7,478,782 B2 | 1/2009 | Huang et al. | | |
| 8,006,937 B1 | 8/2011 | Romano et al. | | |
| 8,240,613 B2 * | 8/2012 | Ritter | ..................... | B64G 1/646 24/595.1 |
| 8,333,347 B2 * | 12/2012 | Ritter | ..................... | B64G 1/646 24/305 |
| 2002/0164204 A1 | 11/2002 | Kaszubowski et al. | | |
| 2004/0231545 A1 | 11/2004 | Lloyd | | |
| 2006/0016935 A1 | 1/2006 | Jordan et al. | | |
| 2007/0029446 A1 | 2/2007 | Mosher et al. | | |
| 2012/0000575 A1 | 1/2012 | Yandle et al. | | |
| 2013/0149894 A1 | 6/2013 | Woydack | | |
| 2013/0263441 A1 | 10/2013 | Boncyk et al. | | |

FOREIGN PATENT DOCUMENTS

| | | |
|---|---|---|
| CN | JP2585382 B2 | 2/1997 |
| CN | 102975867 A | 3/2013 |
| EP | WO2005/118394 | 12/2005 |

* cited by examiner

*Primary Examiner* — Christopher P Ellis
(74) *Attorney, Agent, or Firm* — Russo & Duckworth, LLP; David G. Duckworth

(57) ABSTRACT

An interface connector is provided for connecting homogenous spacecraft cells. The interface connector includes at least one male valve assembly and at least one female valve assembly. The male valve assembly includes an extendable and retractable piston having a central conduit. The female valve assembly has a central bore closed by a ball valve. Preferably, the male and female valves are positioned so that extension of the piston engages the ball valve so as to create a fluid pathway. Various components in the male and female valve assemblies are electrically conductive to allow the transmission of power and data. Further, the male valve assembly is constructed to function as a propulsion thruster when not mated to a female valve assembly.

9 Claims, 5 Drawing Sheets

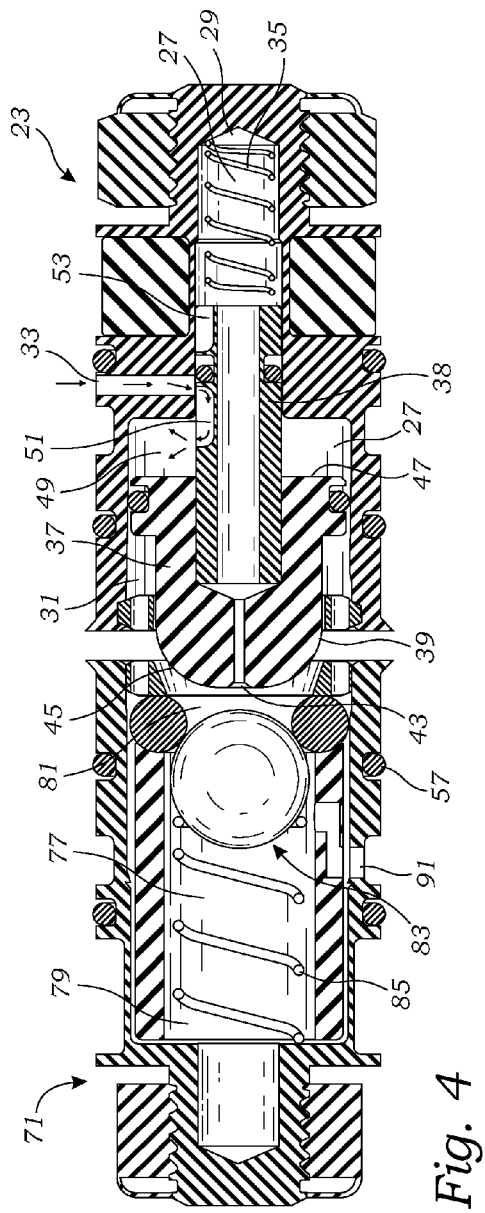
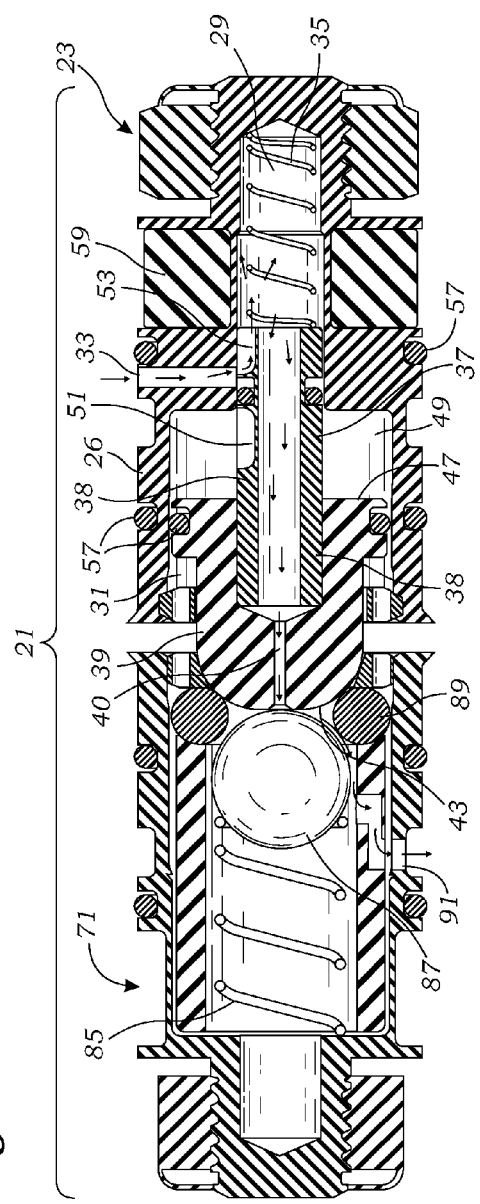
Fig. 4
Fig. 5

SPACECRAFT DOCKING CONNECTOR

This invention was made with government support under contract no. HR0011-14-C-0023 awarded by the Defense Advanced Research Projects Agency. The government has certain rights in the invention.

BACKGROUND OF THE INVENTION

The present invention relates generally to spacecraft engineering and design. More particularly, the present invention relates to structural, fluid, and electrical connectors for interconnection of spacecraft modules. Furthermore, the present invention relates to spacecraft docking and separation systems for providing structural, fluid, and electrical connection between components.

There is an enormous benefit to docking or connecting spacecraft and spacecraft components. The many applications include launching a spacecraft for rendezvous in orbit with another spacecraft. Furthermore, the ability to connect or disconnect spacecraft modules has application where a broken module can be jettisoned and replaced. Electronic and structural components are also connected prior to launch to form a spacecraft.

Structural, fluid and electrical connectors are often combined to create an "interface" connection which is employed in a wide variety of applications. Current spacecraft and launch vehicle interfaces employ various electrical connectors and separation systems including pyrotechnically actuated clamp bands, separation nuts, and separation bolts. The interface must be capable of transferring loads between the two structures. The loads may include vibration, acceleration, thermal conduction, and static loads. For example, U.S. Patent Application Publication No. 2002/0164204 describes a spacecraft interface structure for mechanically connecting various spacecraft components including a spacecraft to a launch vehicle.

Structural, fluid and electrical interface connectors have been developed for in-space docking and separation. For example, U.S. Pat. No. 8,006,937 describes a docking interface in which alignment cups are heated to an austenitic temperature to form a mechanical connection. Power and fluids may be transferred between the two spacecrafts. Fluid, such as a propulsion fluid, is transferred through a central conduit, and data and power can be transferred through the mechanical coupling. Similarly, U.S. Patent Application Publication No. 2012/0000575 describes a docking interface for refueling satellites in space. The docking assembly includes a connector including male and female components for providing fluid transfer. The connector provides electrical power and data transfer as well.

Past spacecraft have been custom designed and optimized for a particular mission or payload wherein electronic components are mounted inside box-like modules. The spacecraft electronic components provide a single spacecraft function, such as power, thermal, structural, telemetry, tracking, control or processing, or a specific payload function, such as communications or surveillance. The modules are mounted to a spacecraft frame and interconnected with extremely complex wiring harnesses. Unfortunately, the designs cannot be adapted to accomplish different missions as changing any part or sub-system typically has required significant rework of the design.

Modular spacecraft are attempts to transition away from custom designed spacecraft toward multi-use designs and mass production in an effort to reduce the cost of spacecraft development. The modular spacecraft include a bus which provides a general purpose spacecraft platform. Various payloads can be mounted to the spacecraft platform utilizing a standard structural, fuel and electric interface. Again, the interface connector is of paramount importance.

Even more recently, spacecraft have been designed by combing homogeneous cells. Each cell possesses the traditional architecture of a spacecraft including structure, power, fuel, attitude control and determination, satellite processing, etc. Each cell is substantially identical so as to be manufactured inexpensively and quickly. These cells are combined to create larger and larger platforms to support payload functions such as communications and surveillance. Though there is substantial redundancy by each cell incorporating all spacecraft sub-system capabilities, the extra costs are more than made up for by mass production savings and rapid assembly. Of course, the satellite reconfigurable cell concept also requires that cells be interconnected by a structural, fluid and electrical interface.

Unfortunately, previous structural, fluid and electrical interface connectors have suffered from various drawbacks.

Thus, there is a need for an improved structural, fluid and electrical connector.

There is also a need for an improved spacecraft connector which can be docked and separated in space.

Additionally, it would be advantageous to provide a connector that can be utilized as a launch lock for affixing a spacecraft to a launch vehicle.

Also desirable would be a spacecraft connector that can be utilized to connect and function as an interface between homogeneous cells of a spacecraft.

Furthermore, it would be desirable to provide a spacecraft connector which is capable of functioning as a propulsion thruster when not functioning as a spacecraft interface connector.

SUMMARY OF THE INVENTION

The present invention addresses the aforementioned disadvantages by providing an improved interface connector which has broad application throughout various industries wherever a connector is required to provide a structural, fluid and electrical connection. The interface connector of the present invention is believed to have particular application for use with vehicles, and particularly spacecraft.

The connector interface of the present invention includes at least one male valve assembly and at least one female valve assembly. The male valve assembly includes a hollow housing forming a central cylindrical bore. The central bore has a proximal end which connects to a fuel supply, such as a fuel supply line or hose. The male valve further includes a piston within the central bore. The piston is retractable into the central bore and extendable from the central bore's distal end. Preferably, the male valve assembly includes one or more O-rings positioned around the piston for forming a fluid tight seal within the central bore's cylindrical surface. Each piston has a central conduit having a proximal end which is in fluid communication with the male valve's central bore. Meanwhile, the distal end of the piston's central conduit projects distally from the central bore's distal end. Further, the piston conduit's distal end is preferably formed to provide a divergent nozzle. The extension and retraction of the piston can be controlled by various mechanical apparatus as can be determined by those skilled in the art. However, in a preferred embodiment, the position of the piston is controlled by a helical spring, pneumatic extension and electromagnetic retraction.

The connector interface's female valve assembly includes a hollow housing having its own central bore which includes a proximal end connected to a fuel tank, such as by a fuel line. A female valve assembly's central bore's distal end forms a receptacle sized for receipt of the male valve assembly's piston. To this end, preferably the piston's distal end has a substantially hemispherical shape sized for engaging an O-ring located within the female valve assembly's receptacle.

Preferably, both the male valve assembly and female valve assembly include a valve for controlling the flow of fluid through their respective valve assemblies. Preferably, the male valve assembly's valve is simply a traditional open and closeable valve situated between a fuel source and the male valve assembly's central bore. Preferably the valve can be controlled by a central processor or the like. Meanwhile, the female valve assembly is preferably provided in the form of a ball valve within the female valve assembly's central bore. The ball valve includes a ball and a spring for biasing the ball towards and against the distally positioned O-ring. To open the ball valve, preferably the movement of the male valve assembly's piston to a distal position causes the piston to engage the ball to retract the ball proximally so as to disengage the O-ring to allow the flow of fluid through the female valve assembly.

The interface connector of the present invention with its male and female valve assemblies is acceptable for use wherever structural, fluid and electrical (power and data) connection is required. For each instance, it is anticipated that the male valve assembly will be mounted to a first apparatus which will be referred to generally as a first frame. Meanwhile, the female valve assembly will be mounted to a second frame. The term "frame" is intended to be interpreted broadly to include any structure or housing of two units to be connected.

In a preferred embodiment, the male valve assembly mounts to a first homogenous satellite cell having a first frame and the female valve assembly mounts to a second homogenous satellite cell having a second frame. Preferably more and more satellite cells are combined utilizing the interface connectors of the present invention to create a larger spacecraft.

In a preferred embodiment, two spacecraft homogeneous cells are connected by a connector interface including two male valve assemblies and two female valve assemblies. The first and second male valve assemblies are mounted to a first spacecraft housing in an outwardly facing coaxially aligned relation to one another. More specifically, each male valve assembly's central bore and piston have the same central axis and the male valve assemblies are mounted in an opposing relation to one another such that extension of the pistons causes the pistons to move axially outward from one another, and retraction of the piston causes them to move axially inward toward each other.

Meanwhile, the first and second female valve assemblies are mounted to a second spacecraft housing. Like the male valve assemblies, the female valve assemblies are mounted to the spacecraft in a manner wherein their central bores are coaxially aligned. However, instead of facing outward, the female valve assemblies are mounted to the second spacecraft in an inwardly facing relationship to one another. Furthermore, the female valve assemblies are mounted so as to be spaced so as to receive the two male valve assemblies, mounted to the first spacecraft, between the female valve assemblies when the male valve assembly pistons are in a retracted condition. However, the female valve assemblies are mounted to the second spacecraft so as to be sufficiently close together that the male valve assemblies and female valve assemblies will lock together when the male valve assembly pistons have projected into an extended position with the pistons projecting into the female valve assembly receptacles. More specifically, the male and female valve assemblies form interface connectors when the male valve assembly pistons are extended into the female valve assembly receptacles so as to engage the O-ring concentrically positioned within the female valve assemblies central bores.

Advantageously, the pair of connectors, each with its own male and female valve assembly, forms a structural connection as the respective connectors, and spacecraft, cannot disengage without the connector pistons retracting. Moreover, the connectors form a fluid connection as a fluid flow path is provided from a first fuel tank in the first spacecraft through the male assembly's central bore, piston conduit, and through the female assembly's central bore to the second fuel tank in the second spacecraft. Moreover, preferably the connectors provide an electrical connection between spacecraft. Specifically, preferably the male valve assemblies helical springs and pistons are electrically conductive, and the female valve assemblies ball valve balls and helical springs are electrically conductive to allow the transmission of power and data.

In addition, it is preferred that the male valve assembly be constructed so as to allow the piston to function as a propulsion thruster when not mated to a female valve assembly. To this end, it is preferred that the piston's distal opening be constructed in the form of a divergent propulsion nozzle. When not mated to a female valve assembly, propellant from a fuel storage tank can be made to flow through the male valve assembly and ejected from the piston's divergent nozzle by opening the male valve assembly's controllable valve. A preferred propellant is R134 tetrafluoroethane, though another cold gas, warm gas, or mono-propellant such as hydrazine would also be acceptable.

Advantageously, it is an object of the present invention to provide a connector that provides improved structural integrity, such as for spacecraft docking applications. Unlike previous connectors, the present connectors utilize its mechanical properties of transferring force primarily in sheer and not normal.

It is an additional object of the present invention to provide a connector that can be docked and separated in space.

Still another object of the present invention is to provide an improved connector which provides structural, fluid and electrical (power and data) connectivity.

Furthermore, it is an object of the present invention to provide a spacecraft connector which is capable of functioning as a propulsion thruster when not mated.

Other features and advantages of the present invention will be appreciated by those skilled in the art upon reading the detailed description which follows with reference to the attached drawings.

BRIEF DESCRIPTION OF THE DRAWINGS

FIG. 4 is a side cut-away view of the male and female valve assemblies of the interface connector of the present invention wherein the male valve assembly piston is being actuated from a soft dock condition to an extended locking condition;

FIG. 5 is a side cut-away view of the male and female valve assemblies of the interface connector of the present invention wherein the male valve assembly piston has been extended so as to lock male and female valve assemblies together;

DETAILED DESCRIPTION OF THE INVENTION

Figure 1:
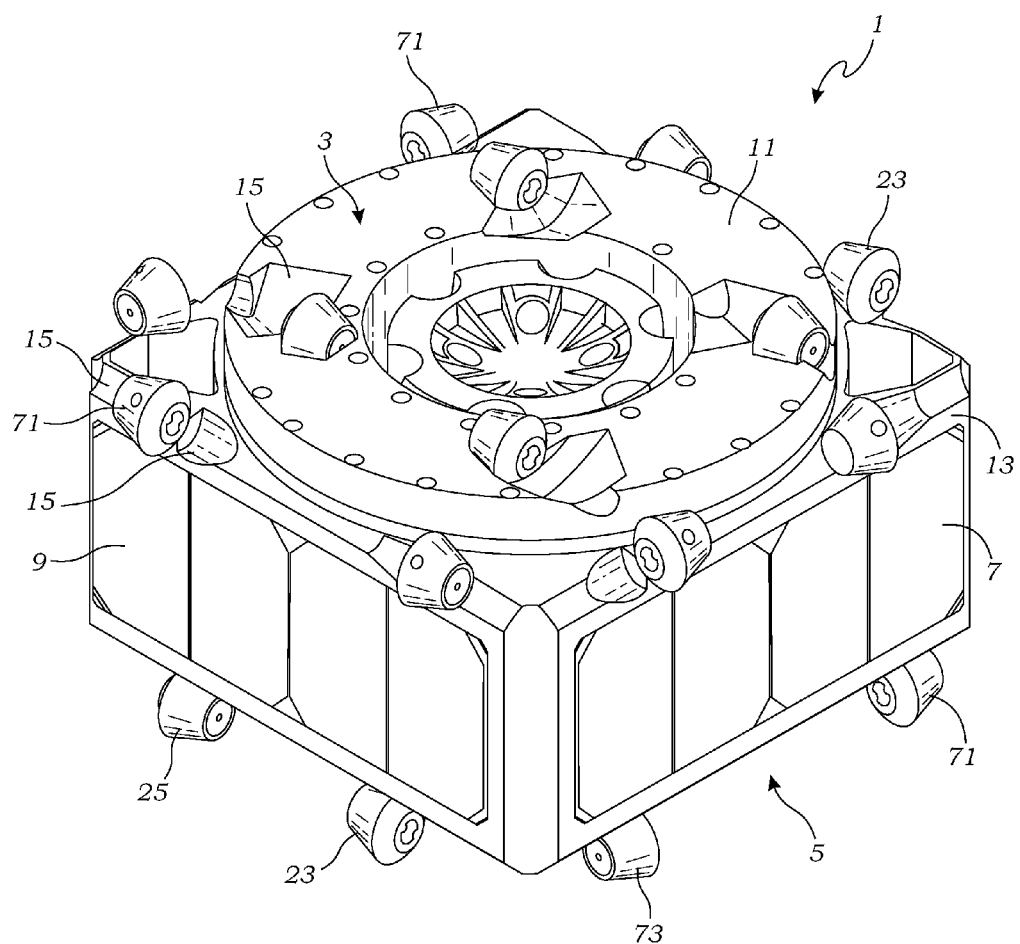
FIG. 1 is a perspective view of a spacecraft homogenous cell incorporating traditional spacecraft architecture with a plurality of unmated male and female valve assemblies of the present invention.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

Figure 2:
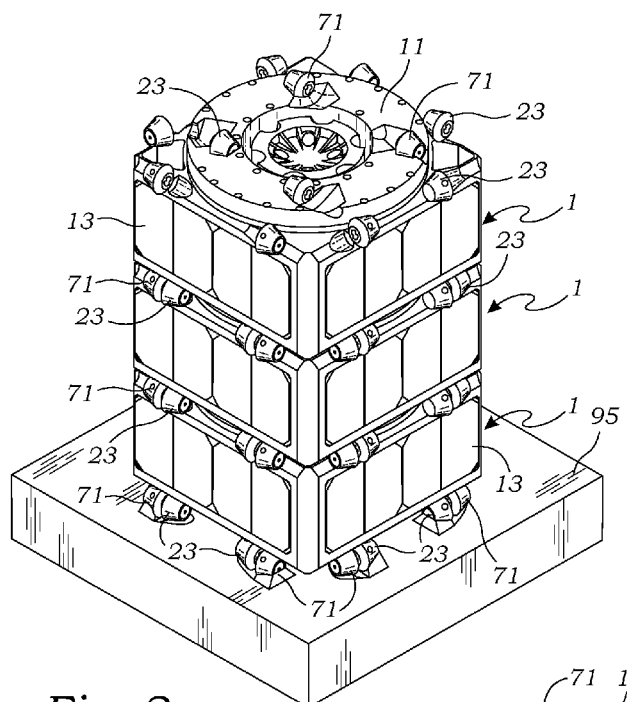
FIG. 2 is a perspective view illustrating three (3) homogenous spacecraft cells connected in a stacked condition utilizing the interface connectors of the present invention.
Figure 3:
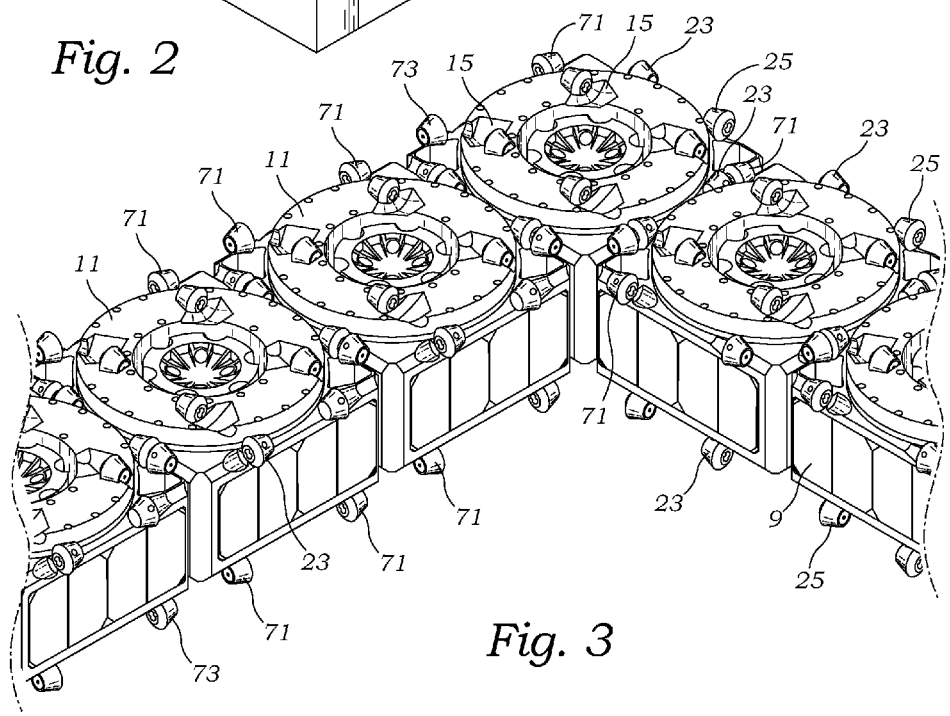
FIG. 3 is a top perspective view illustrating six (6) homogenous spacecraft cells connected side-by-side utilizing the interface connectors of the present invention.

With reference to the figures, the present invention is an interface connector 21 having particular usefulness in connecting homogeneous spacecraft cells 1. As illustrated in FIGS. 1-3 a preferred homogenous spacecraft cell 1 has a top 3 a bottom 5, and four sides 7. The homogenous cell may include one more solar panels 9 and one or more momentum wheels 11. In addition, the spacecraft cell 1 has a housing 13 forming a frame upon which the interface connectors 21 are mounted.

The interface connector 21 includes a male valve assembly 23 and a female valve assembly 71. As best illustrated in FIGS. 1-3, the male valve assembly 23 has a tapered housing 25. The housing's tapered shape is considered ideal for in-space rendezvous and docking so as to self align when received by correspondingly shaped beveled recesses 15 formed upon another homogenous spacecraft cell. As illustrated in FIGS. 4-8, the male valve assembly's housing 25 may include a removable insert 26 for allowing the installation and removal of the remaining valve assembly components from within the male valve assembly's housing. O-rings 57 may be provided between the housing's insert 26 and exterior tapered portion of the housing so as to affix the insert 26 in place.

As illustrated in FIGS. 4-8, the male valve assembly 23 includes a central bore 27. Preferably, the cylindrical bore has a circular cross-section. As illustrated in the figures, the central bore has a smaller diameter towards its proximal end 29 and a larger diameter at its distal end 31. Furthermore, the male valve assembly's central bore is connected to a fuel source such as by a fuel line 33 which radially projects through the valve assembly's housing towards the central bore's proximal end.

The male valve assembly 23 also includes a piston 37. As illustrated in the figures, a preferred piston is manufactured to include two components including a smaller diameter shaft 38 and a larger diameter piston head 39. Preferably, the piston head 39 has a diameter sufficiently large to form a substantially gaseous tight seal within the central bore 27. Furthermore, the piston may include an O-ring concentrically positioned around the piston head to form a gaseous tight seal between the piston head and the cylindrical surface of the central bore 27. Advantageously, the difference in diameter between the piston's shaft 38 and piston head 39 provides the piston head with a circular collar region 47. The smaller diameter shaft 38 slidably resides within the smaller proximal end 29 of the central bore 27. Meanwhile, the larger diameter piston head 39 slidably resides in the larger distal end 31 of the central bore 27. The piston 37 includes a central conduit 40 which extends the entire length of the piston through the shaft 38 and piston head 39. Preferably, the piston head 39 includes a divergent nozzle 43 forming the distal end of the central conduit 40.

The male valve assembly's piston 37 is capable of moving proximally and distally within the central bore 27. Movement of the piston can be actuated by various electrical or mechanical apparatus known to those skilled in the art. Applicant's preferred interface connector 21 includes a piston which is projected distally using pneumatic actuation, but moved proximally using an electromagnetic actuator. Moreover, it is preferred that the piston be maintained in a neutral central position by a helical spring 35 when not actuated proximally or distally.

To enable the piston 37 to be pneumatically extended, the piston shaft 38 has a first channel 51 which extends from the fuel line 33 into a chamber 49 formed behind the piston's collar 47 when the piston is in a neutral "soft dock" position. As illustrated in FIG. 4, the release of propellant through the fuel line 33, such as by opening a fuel valve (not shown), allows propellant to flow through the first channel 51 into chamber 49 so as to pneumatically force the piston distally. As illustrated in FIG. 5, the piston is forced distally until the first channel 51 is no longer in fluid communication with the fuel line 33. Preferably an O-ring 57 is provided to provide a fluid tight seal so as to prevent further propellant passing through the first channel 51 into chamber 49.

As illustrated in FIGS. 4-8, preferably the piston shaft 38 further includes a second channel 53 which comes into fluid communication with the fuel line 33 when the piston has been extended to a distal position. As illustrated in FIG. 5, the second channel 53 connects the fuel line 33 with the male valve assembly's central bore 27 at the central bore's proximal end 29 so as to allow propellant to flow through the fuel line into the central bore 27, and thereafter through the piston's central conduit 40, so as to be ejected from the piston's distal end 43.

Figure 7:
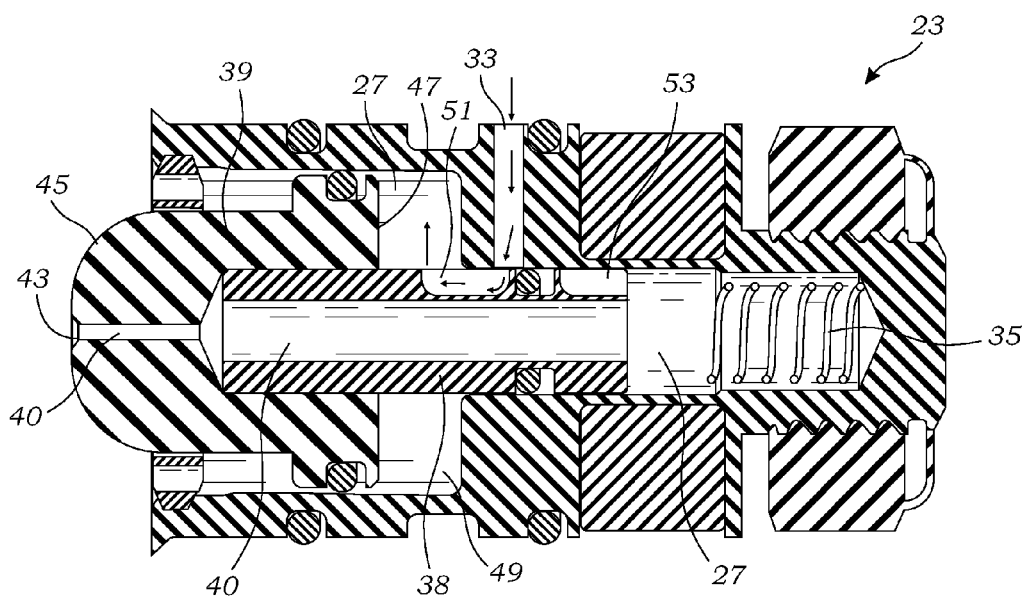
FIG. 7 is a side cut-away view of a male valve assembly of the present invention wherein the male valve assembly's piston is being actuated from a soft dock condition to an extended condition.
Figure 8:
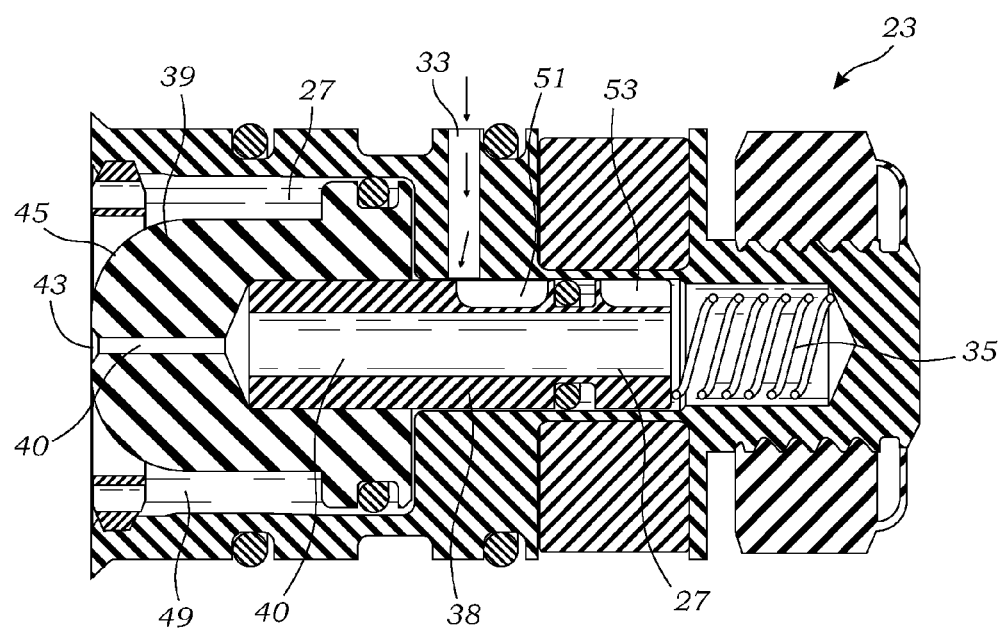
FIG. 8 is a side cut-away view of the male valve assembly wherein the male valve assembly's piston has been retracted.

To move the piston 37 in the proximal direction, the male valve assembly 23 includes a magnetic actuator including an electrical magnetic field generator, such as a coil winding 59 concentrically positioned around the piston's shaft 38. As understood by those skilled in the art, incorporating magnetic properties into the shaft 38 in cooperation with a controllable electromagnetic field provided by the magnetic field actuator 59 will cause the piston 37 to move in the proximal direction such as illustrated in FIG. 7.

As illustrated in each of the figures, the interface connector 21 also includes a female valve assembly 71 intended to connect with the male valve assembly 23. The female valve assembly 71 includes a tapered housing 73 which is also sized to be received and aligned within beveled recesses 15 formed within a homogenous spacecraft cell's housing 13. Preferably the female valve assembly's housing also includes an insert 75 for allowing the valve assembly components to be easily installed and removed.

As illustrated in FIGS. 4 and 5, the female valve assembly includes a central bore 77 having a proximal end 79 and a distal end 81. The distal end is closeable by a ball valve 83. The ball valve includes a ball 87, an O-ring 89 having an inner diameter smaller than the diameter of the ball, and a helical spring 85 for biasing the ball distally into the O-ring for creating a fluid tight seal. As understood by those skilled in the art, the helical spring 85 maintains the ball valve in a normally closed condition. However, movement of the ball 87 in the proximal direction, such as by engagement by a male valve assembly piston 37, will cause the ball valve to open. The female valve assembly further includes a fuel line 91 so that the female valve assembly's central bore 77 is connected to a fuel source (not shown).

As illustrated in FIGS. 4-8, a connector 21 of the present invention includes both a male valve assembly 23 connected to a female valve assembly 71. In a preferred embodiment, the interface connector 21 includes two sets of male and female valve assemblies. As illustrated in FIGS. 1-3, for this embodiment, the first and second male valve assemblies 23 are mounted, for example to a first spacecraft housing 13, in an outwardly facing coaxially aligned relationship to one another. More specifically, each male valve assembly's central bore 27 and piston 37 share the same axis and the male valve assemblies are mounted so that each piston extends outward from one another and each piston retracts toward each other. Meanwhile, the female valve assemblies are mounted to a second spacecraft housing in a manner wherein the female valve assemblies central bores are also coaxially aligned. However, the female valve assemblies are positioned to be inwardly facing, and aligned and spaced so as to connect with two male valve assemblies.

FIG. 4 illustrates a soft dock connection between a male valve assembly 23 and a female valve assembly 71. The male valve assembly's piston is maintained in a neutral condition by the spring 35. The male piston 37 projects partially into the female valve assembly's receptacle 62, but the piston is not extended so far as to engage the female valve assembly's O-ring 89 so as to form a fluid tight seal. Without introduction of a gas, such as a propellant, into the male valve assembly's chamber 49, the piston 37 can be displaced proximally relatively easily so as to allow engagement or disengagement of the male valve assembly to the female valve assembly. However, as illustrated in FIGS. 5 and 7, the introduction of propellant from fuel line 33 through first channel 51 into the male valve assembly's chamber 49 causes the piston 37 to move distally into the female valve assembly's receptacle 62 so as to engage and form a fluid tight seal with the female valve assembly's O-ring 89. Though not illustrated in the figures, the piston conduit's distal end has a lateral slit across the divergent nozzle 43 so as to prevent a fluid tight seal between the piston's conduit 40 and the female valve assembly's ball 87. Thus, as illustrated in FIG. 5, when the male valve assembly piston has been moved to a distal "hard dock" position, gas is freely capable of flowing through the male and female valve assemblies, as controlled by a valve connected to the male valve assembly's fuel line 33. As would be understood by those skilled in the art, the opening of this valve causes propellant to flow from the high pressure region in either the first or second spacecraft, to the low pressure region in the first or second spacecraft. Disconnection of the male valve to the female valve and a resulting undocking of spacecraft can be accomplished by energizing the male valve assembly's magnetic coil winding 59 so as to retract the piston 37.

The interface connector 21 provides a structural-mechanical connection between two objects, such as affixing a spacecraft to a launch vehicle or connecting two homogenous spacecraft cells 1. For example, as illustrated in FIG. 2, the interface connector 2 can connect a spacecraft comprised of plurality of homogenous cells 1 to a vehicle launch support structure 95. Meanwhile as illustrated in FIGS. 1-4, preferably four sets of male and female valve assemblies are used to structurally connect two homogeneous spacecraft cells. Two male valve assemblies 23 and two female valve assemblies 71 are mounted to the side of a first spacecraft. As illustrated, these respective valve assemblies are affixed to opening edges of one side of the spacecraft. Meanwhile, the second homogenous spacecraft cell 1 also includes two male valve assemblies 23 and two female valve assemblies 71 mounted to opposing edges of a spacecraft side. The male valve assemblies are aligned to be outwardly facing and positioned between the female valve assemblies which are inwardly facing. The homogenous cells can be stacked as illustrated in FIG. 2 or positioned side-by-side as illustrated in FIG. 3. Moreover, preferably the homogeneous cells include a carrousel 11 which incorporates reaction wheel, momentum wheel, control moment gyroscope, and/or gimbal capabilities. Preferably, the carousels 11 of adjoining cells can also be externally connected utilized four sets of male and female valve assemblies.

In addition to providing a structural connection, the interface connector 21 of the present invention provides a fluid connector so as to allow propulsion fluids to flow from one spacecraft to another as illustrated in FIG. 5. Finally, the interface connector is capable of transmitting power and data. For this embodiment, preferably the female valve assembly's insert portion 75 of housing 73, helical spring 85, and ball 87 are electrically conductive. Conversely, it is preferred that the male valve assembly's insert portion 26 of housing 25, piston 37 and helical spring 35 be electrically conductive. Movement of the piston 37 to a distal position to engage ball 87 provides an electrical connection through the male and female valve assemblies so as to permit the transmission of power and data.

Figure 6:
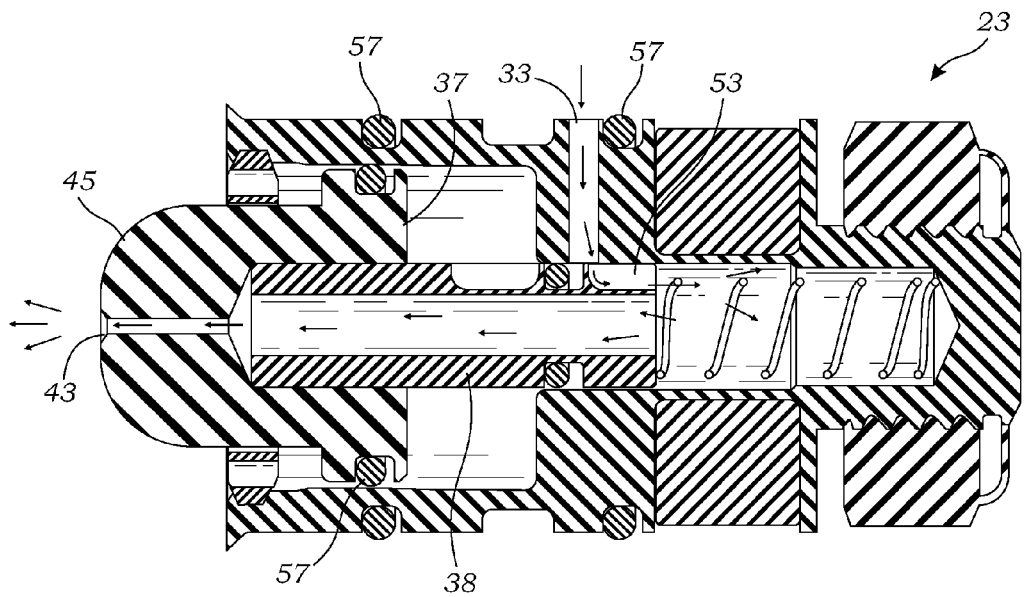
FIG. 6 is a side cut-away view of a male valve assembly wherein the piston has been extended and propellant is being ejected from the piston's distal nozzle.

As illustrated in FIG. 6, the male valve assembly 23 is capable of functioning as a propulsion thruster when not mated to a female valve assembly. By opening the valve restricting the flow of propellant through fuel line 33 causes the piston to move distally so as to allow the passage of propellant into second channel 53 to the male valve assembly's central bore 27. Propellant is then ejected from the piston's divergent nozzle 43 to provide station keeping or propulsion.

As would be understood by those skilled in the art, the opening or closing of the valve supplying fuel to the male valve assembly's fuel line 33 is preferably controlled by one or more control processors, referred to herein as a controller. The controller may be a general purpose computer or microprocessor including hardware and software as can be determined by those skilled in the art to provide automated or directed control of the fuel valve so as to open and close the valve to thereby control the flow of fuel through the male valve assembly and the female valve assembly when a connector is in a mated condition. Similarly, the same controller, or a separate controller, is connected to the electromagnetic actuator 59 to control the retraction of a piston 37. In addition the same controller, or a separate controller, controls the expulsion of the propellant from the male valve assembly's nozzle 43 when the male valve assembly 23 is not connected to a female valve assembly 71. Furthermore, one or more controllers may control the transmission of power and data through the male and female valve assemblies from the one connected.

While several particular forms of the invention have been illustrated and described, it will be apparent that various modifications can be made without departing from the spirit and scope of the invention. Therefore, it is not intended that the invention be limited except by the following claims.

Having described my invention in such terms so as to enable person skilled in the art to understand the invention, recreate the invention and practice it, and having presently identified the presently preferred embodiments thereof I claim:

1. A docking connector interface comprising:
    a first frame;
    a first fluid source;
    first and second male valve assemblies, each of said male valve assemblies having a hollow housing forming a central bore having a proximal end connected said fluid source and a distal end, each of said first male valves having a piston positioned within each of said central bores with being retractable and extendable from said central bores distal ends, each of said pistons having a central conduit having a proximal end in fluid communication with said central bores for receiving fluid from said central bores and a distal end projecting from said central bores' distal ends; each of said first and second male valve assemblies including a controllable valve to control the flow of fluid through each of said central bores and piston conduits;
    said first and second male valve assemblies mounted to said first frame in outwardly facing coaxially aligned relation to one another wherein each housing's central bore and each pistons' central conduit define the same axis, and said first and second male valve assemblies mounted to said first frame in opposing relation to one another such that extension of both of said pistons causes said pistons to move axially outward and away from each other, and retraction of said pistons causes said pistons to move axially inward and toward each other;
    a second frame;
    a second fluid source;
    first and second female valve assemblies, each of said female valve assemblies having a hollow housing forming a central bore having a proximal end connected to said second fluid source and a distal end forming a receptacle sized for receipt and a substantially fluid tight seal with a male valve assembly piston;
    said first and second female valve assemblies mounted to said second frame in an inwardly facing coaxially aligned relation to one another wherein said female valve assemblies' central bores define the same axis, and said first and second female valve assemblies are mounted to said second frame in an inwardly facing relation and spacing so as to accept said male valve assemblies between said female valve assemblies when said male valve assembly pistons are retracted and said male valve assemblies locking to said female valve assemblies with said male valve assembly pistons projecting into said female valve assembly receptacles when said pistons are extended;
    one or more controllers for controlling the retraction and extension of said male valve assembly pistons, for controlling the flow of fluid between said first and second-fluid sources when said male valve assemblies are connected to said female valve assemblies, and for controlling the expulsion of fluid from said male valve assembly piston distal ends to provide propulsion when said male valve assemblies are not connected to said female valve assemblies.

2. The docking connector interface of claim 1 wherein:
    said male and female valve assemblies include components that are electrically conductive allowing the transmission of power and data through said male and female valve assemblies; and
    said one or more controllers controls the transmission of power and data through said male and female valve assemblies when said male valve assemblies are connected to said female valve assemblies.

3. The docking connector interface of claim 1 further comprising:
    each of said female valve assemblies having a ball valve within said female valve assemblies' central bores, each of said ball valves including an O-ring annularly positioned at the distal end of said central bore, a ball within each of said female assemblies central bores proximal to said O-ring and having a diameter sized greater than the inner diameter of said O-ring, and a spring for biasing said ball toward said O-ring; and
    each of said male valve assembly including a spring for biasing said pistons into a distal position.

4. The docking connector interface of claim 3 wherein:
    each of said female valve assembly ball valve balls and springs being electrically conductive allowing the transmission of power and data through said female valve assemblies;
    each of said male valve assembly pistons and springs being electrically conductive allowing the transmission of power and data through said male valve assemblies; and
    said one or more controllers controls the transmission of power and data through said male and female valve assemblies when said male valve assemblies are connected to said female valve assemblies.

5. The docking connector interface of claim 1 wherein each of said distal ends of said male valve assemblies' piston conduits forms a divergent propulsion nozzle.

6. A connector interface comprising:
    a first frame;
    a first fluid source;
    a first male valve assembly mounted to said first frame, said first male valve assembly having a hollow housing forming a central bore, said central bore having a proximal end connected said first fluid source and a distal end, said first male valve having a piston positioned within said central bore being retractable and extendable from said central bore's distal end, said piston having a central conduit having a proximal end in fluid communication with said central bore for receiving fluid from said central bore and a distal end projecting from the central bore's distal end; said first male valve assembly including a controllable valve to control the flow of fluid through said male valve assembly central bore and piston conduit;
    a second frame;
    a second fluid source;
    a first female valve assembly mounted to said second frame, said first female valve assemblies having a hollow housing forming a central bore having a proximal end connected to a said second fluid source and a distal end forming a receptacle sized for receipt and a substantially fluid tight seal with a male valve assembly piston;
    said male and female valve assemblies include components that are electrically conductive to allow the transmission of power and data through said male and female valve assemblies; and
    one or more controllers for controlling the retraction and extension of said male valve assembly piston, for controlling the flow of fluid between said first and second fluid sources when said male valve assembly is connected to said female valve assembly, for controlling the expulsion of fluid from said male valve assembly piston distal end to provide propulsion when said male valve assembly is not connected to said female valve assembly, and for controlling the transmission of power and data through said male and female valve assemblies.

7. The connector interface of claim 6 further comprising:

said female valve assembly having a ball valve within said female valve assembly's central bore, said ball valve including an O-ring annularly positioned at the distal end of said central bore, a ball within said female valve assembly's central bore proximal to said O-ring and having a diameter sized greater than the inner diameter of said O-ring, and a spring for biasing said ball toward said O-ring; and said male valve assembly including a spring for biasing said piston into a distal position.

8. The connector interface of claim 7 wherein:

said female valve assembly ball valve ball and spring being electrically conductive allowing the transmission of power and data through said female valve assembly;

said male valve assembly piston and spring being electrically conductive allowing the transmission of power and data through said male valve assemblies.

9. The connector interface of claim 6 wherein said distal end of said male valve assembly's piston conduits forms a divergent propulsion nozzle.

\* \* \* \* \*